US006772426B2

(12) United States Patent
Akatani

(10) Patent No.: US 6,772,426 B2
(45) Date of Patent: Aug. 3, 2004

(54) DISK CARRIER DEVICE

(75) Inventor: Shigeru Akatani, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 297 days.

(21) Appl. No.: 10/105,168

(22) Filed: Mar. 26, 2002

(65) Prior Publication Data

US 2003/0063550 A1 Apr. 3, 2003

(30) Foreign Application Priority Data

Sep. 28, 2001  (JP) .................................... 2001-299316

(51) Int. Cl.[7] .......................................... G11B 17/04
(52) U.S. Cl. ................................ 720/624; 720/661
(58) Field of Search ............................. 720/619, 624, 720/608, 661; 369/75.1, 75.2, 77.1

(56) References Cited

U.S. PATENT DOCUMENTS

| 5,022,023 A | * | 6/1991 | Toyoguchi ................. 369/77.1 |
| 5,084,855 A | * | 1/1992 | Kobayashi et al. ........ 369/75.2 |
| 5,467,334 A | * | 11/1995 | Kim .......................... 369/77.1 |
| 6,411,582 B1 | * | 6/2002 | Nakatani et al. ........... 369/75.2 |
| 6,414,929 B1 | * | 7/2002 | Fujiwara ..................... 369/77.1 |
| 6,563,778 B2 | * | 5/2003 | Tanaka et al. .............. 369/77.1 |
| 6,597,651 B1 | * | 7/2003 | Kage et al. ................. 369/77.1 |

FOREIGN PATENT DOCUMENTS

JP    2000-298903    4/1999

* cited by examiner

*Primary Examiner*—David Ometz
(74) *Attorney, Agent, or Firm*—Reed Smith LLP; Stanley P. Fisher, Esq.; Juan Carlos A. Marquez, Esq.

(57) ABSTRACT

The disk carrier device of the present invention comprises a carrier gear rotation-driven by a motor, control members driven by the motor via this carrier gear, for moving in one direction or in the other direction according to the direction of rotation of the motor, and a transmission gear which transmits the rotation of the motor to a feed roller. A rotation control section and a roller position control section are provided in the control member, respectively. At the time of ejecting the disk, with the movement of the control member, the feed roller is made to approach the disk guide by the roller position control section, and then the transmission gear is shifted to the transmission position by the rotation control section.

3 Claims, 7 Drawing Sheets

DISK CARRIER DEVICE

BACKGROUND OF THE INVENTION

1. Field of the Invention

The present invention relates to a disk carrier device which clamps a disk by a feed roller and a disk guide, and carries the disk by the rotation of the feed roller.

2. Description of the Related Art

In the disk player having a disk insertion slot, there is provided a disk carrier device which carries a disk between the disk insertion slot and the turntable. As the disk carrier device, one which clamps the disk by a feed roller and a disk guide and rotates the feed roller by a motor to thereby carry the disk has been often used. Recently, in order to reduce the cost of the disk carrier device, there is known a disk carrier device which rotates the feed roller by a motor for driving the pickup, as introduced in Japanese Unexamined Patent Publication No. 2000-298903. In the disk carrier device disclosed in this publication, the disk is clamped between the feed roller and the disk guide, and the feed roller is rotated by the motor for driving the pickup, so that the disk is carried between the disk insertion slot and the turntable.

In this kind of disk player, as shown in FIG. 11, when playback of the disk 2 is being performed, the disk guide 3 and the feed roller 4 are alienated by about 2 mm from the face of the disk 2 so as not to disturb the rotation of the disk. When the ejection operation of the disk 2 is performed from this state, the rotation of a turntable motor 5 is first stopped, and then as shown in FIG. 12, a clamper 6 is alienated from the turntable 7. Then, as shown in FIG. 13, the feed roller 4 comes in contact with the disk 2, and as shown in FIG. 14, lifts the disk 2 so as to push the disk 2 to a disk guide 3. The disk 2 is then fed out from the disk insertion slot 9 in a front panel 8 by the rotation of the feed roller 4. At this time, positioning of the disk 2 clamped between the feed roller 4 and the disk guide 3 is performed by the disk guide 3 in a height so that the disk 2 does not come in contact with the disk insertion slot 9.

In such a disk ejection operation, with the conventional disk player, the rotation of the motor is transmitted to the feed roller continuously during the disk ejection operation. Therefore, as shown in FIG. 13, as soon as the feed roller 4 comes in contact with the disk 2, the disk 2 is carried towards the disk insertion slot 9 by the rotation of the feed roller 4. Since the disk 2 has not yet reached the height of the disk insertion slot 9, the edge of the disk touches the edge of the disk insertion slot 9. As a result, there is a problem in that not only the disk cannot be ejected smoothly, but also the disk may be damaged, at the time of being pushed up in the state with the disk being caught by the edge of the disk insertion slot 9.

SUMMARY OF THE INVENTION

It is an object of the present invention to provide a disk carrier device which can smoothly eject the disk, without damaging the disk.

The disk carrier device of the present invention comprises a carrier gear 42 rotation-driven by a motor, control members driven by the motor via this carrier gear, for moving in one direction or in the other direction according to the direction of rotation of the motor, and a transmission gear which transmits the rotation of the motor to a feed roller, and the control member is provided with a rotation control section and a roller position control section. When the direction of rotation of the carrier gear is in the direction of rotating the feed roller in the unloading direction via the transmission gear, the feed roller is made to approach the disk guide by the roller position control section, with the movement of the control member, and then the transmission gear is shifted to the transmission position by the rotation control section.

Therefore, the disk is clamped between the feed roller and the disk guide so as to match the height with that of the disk insertion slot, and then ejected by the rotation of the feed roller. Hence, the ejection can be performed smoothly, without damaging the disk.

By constituting the roller position control section and the rotation control section by a cam groove respectively, the relation between the timing for clamping the disk between the feed roller and the disk guide and the rotation starting timing of the feed roller can be easily set. If the control member is stably held alternatively at the opposite movement termination positions by a contrarotating spring, the control member does not desperately move, thereby further facilitating the operation control.

DESCRIPTION OF THE PREFERRED EMBODIMENT

The preferred embodiment of the present invention will now be described with reference to FIG. 1 to FIG. 10. The part similar to that described in the related art will be denoted by the same reference symbol.

Figure 1:
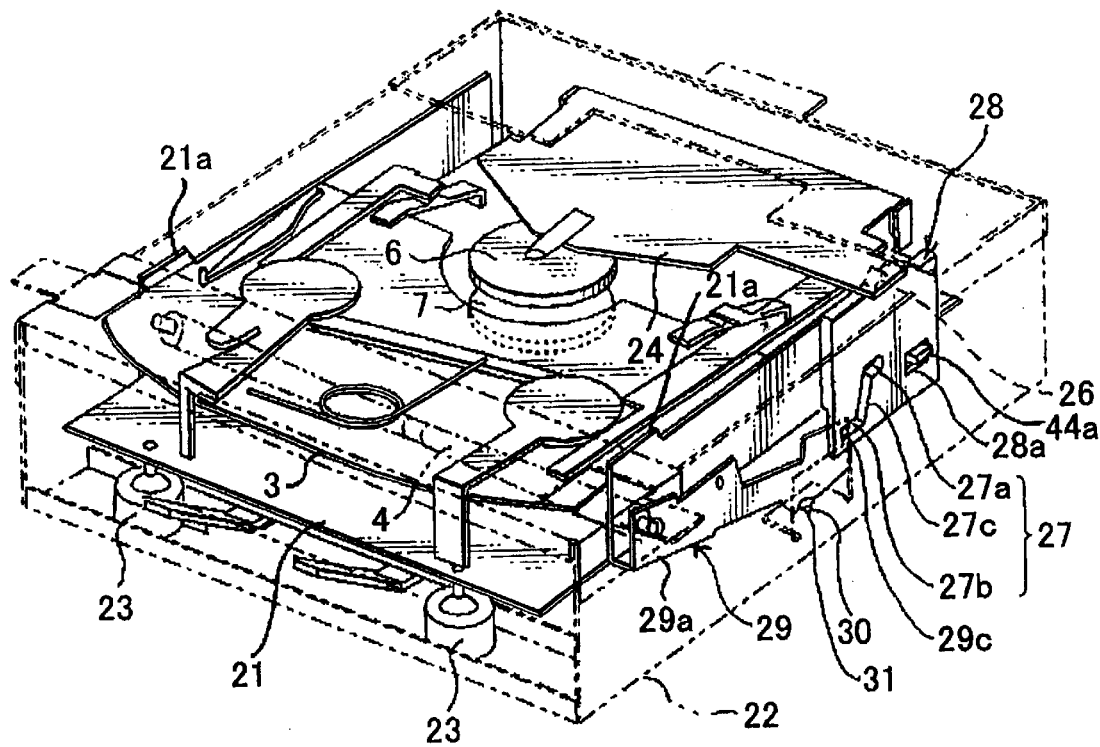
FIG. 1 is a diagram showing the appearance of a disk player in which a disk carrier device of the present invention is incorporated.
Figure 2:
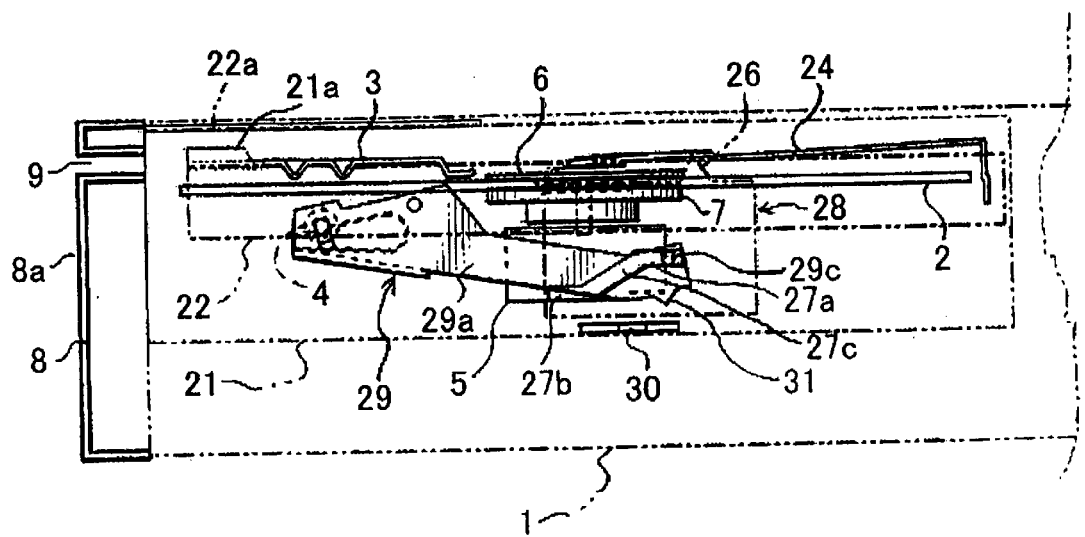
FIG. 2 is a side view showing the playback state of the disk.
Figure 3:
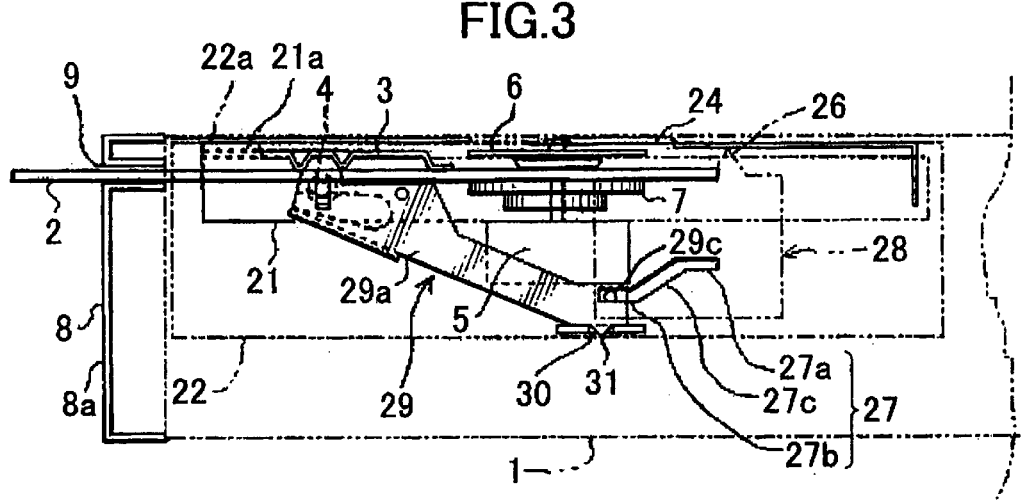
FIG. 3 is a side view showing the state when the disk is ejected.

FIG. 1 is a perspective view showing the appearance of a disk player mounted on vehicles. FIG. 2 and FIG. 3 are side views showing the state that the disk player is housed in a cabinet 1. FIG. 4 to FIG. 7 are plan views showing the power transmission route of the motor. A playback substrate 21 shown in FIG. 1 is mounted in the state floating within the outside chassis 22 via a spring (not shown) and a damper 23. A turntable 7 is arranged at the center of this playback substrate 21, and a clamper 6 is arranged above the turntable 7. The clamper 6 is supported by a support plate 24 rotatably fitted to the playback substrate 21. Moreover, a disk guide 3 is fitted above the playback substrate 21, and a feed roller 4 is arranged on the undersurface side of this disk guide 3.

On one side of this playback substrate 21, there is attached a cam plate 28 (first control member) having a clamp cam 26 and a roller cam 27 (a roller position control section) so as to freely advance or retreat. The clamp cam 26 is meshed with the support plate 24 to move the clamper 6 so as to approach or separate from the turntable 7. The roller cam 27 is formed by an upper horizontal groove 27a for keeping the feed roller 4 alienated from the disk 2, a lower horizontal groove 27b for keeping the disk 2 clamped between the feed roller 4 and the disk guide 3, and a tilted groove 27c connecting the both grooves 27a and 27b. The feed roller 4 is a long rubber-made cylindrical body, and arranged between a disk insertion slot 9 and the turntable 7, with the opposite ends supported rotatably by a bracket 29. This bracket 29 is supported such that the opposite side plates 29a and 29b can be rotated on the opposite sides of the playback substrate 21, and forms on one side 29a a protrusion 31 which meshes with or disengages from a lock hole 30 in the outside chassis 22 and a cam pin 29c which meshes with the roller cam 27.

As shown in FIG. 2, when the disk 2 is played back, this bracket 29 keeps the playback substrate 21 in the floating state with respect to the outside chassis 22, by pulling out the protrusion 31 from the lock hole 30. However, when the disk 2 is inserted into or taken out from the disk insertion slot 9, as shown in FIG. 3, the protrusion 31 is fitted into the lock hole 30, and the whole playback substrate 21 is lifted so that the upper part 21a of the external form of the playback substrate 21 is pushed against the ceiling 22a of the outside chassis, to thereby restrain the floating state of the playback substrate 21 with respect to the outside chassis 22. In this manner, if the playback substrate 21 is pushed against the ceiling 22a of the outside chassis to restrain the floating state, the disk insertion slot 9 can be set at a position biased to the upper position in a front panel 8, thereby enabling an increase in the area of a disk play screen 8a in the front panel 8.

However, in this case, at the time of disk playback, since the upper part 21a of the playback substrate 21 is alienated from the ceiling 22a of the outside chassis 22, when the playback substrate 21 is in the floating state with respect to the outside chassis 22, there is a large difference in level of the dimension in the height direction between the disk insertion slot 9 and the disk guide 3.

Figure 4:
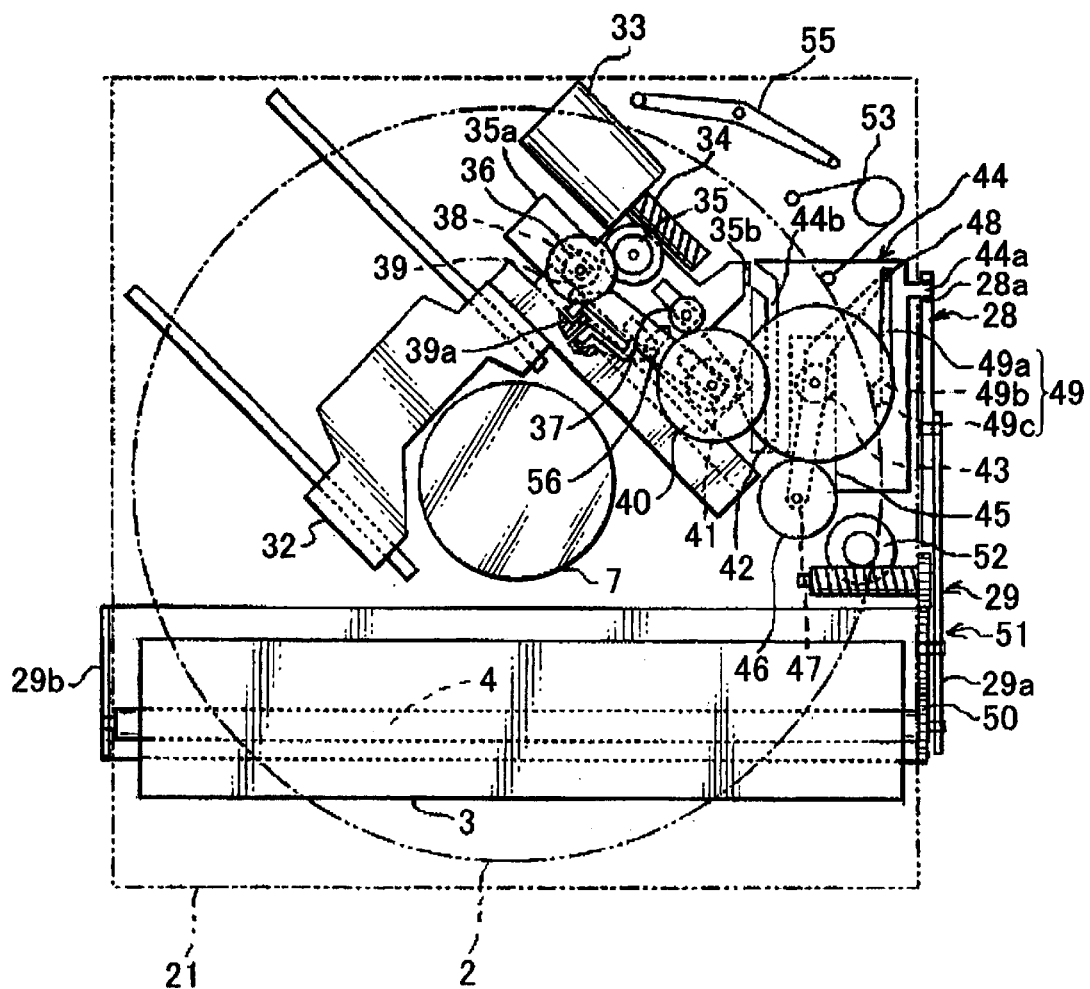
FIG. 4 is a plan view showing the playback state of the disk.

As shown in FIG. 4, the turntable 7 is arranged in the center of the playback substrate 21, and a pickup 32 is fitted on the backside of the substrate so as to be freely movable in a diagonal direction of the playback substrate. A pickup motor 33 which moves this pickup 32 in the advancing or retreating direction is also fitted to the playback substrate 21, with the rotation shaft thereof being parallel with the moving direction of the pickup 32. A worm gear 34 is fitted to this rotation shaft, and a worm wheel 35 which always meshes with this worm gear 34 is fitted to a move board 35a which is movable in the direction of the rotation shaft. The playback substrate 21 has a first gear 36 and a second gear 37 mounted thereon, so that the worm wheel 35 meshes with the first gear 36 at a position moving in one direction, and with the second gear 37 at a position moving in the other direction. On the first gear 36, there is formed a third gear 38 which rotates integrally therewith, and this third gear 38 meshes with a rack board 39 formed on the pickup 32. When the worm wheel 35 meshes with the first gear 36, if the pickup motor 33 rotates, the pickup 32 advances or retreats corresponding to the direction of rotation.

On the other hand, a fourth gear 40 always meshes with the second gear 37, and when the worm wheel 35 meshes with the second gear 37, the rotation of the second gear 37 is decelerated and transmitted to a sixth gear 42 (carrier gear) via a fifth gear 41 integral with the fourth gear 40. A seventh gear 43 formed integrally with this sixth gear 42 meshes with a rack 45 in a control plate 44 (second control member). Also, an eighth gear 46 (transmission gear) always meshes with the sixth gear 42 as a satellite gear of the sixth gear 42. This eighth gear 46 is attached to one end of an arm 47 which is rotatable about the rotation shaft of the sixth gear 42. A cam follower 48 is provided at the other end of this arm 47, which is fitted to a cam groove 49 (rotation control section) in the control plate 44. On the other hand, a group of gears 51 meshing with a roller gear 50 of the feed roller 4 is mounted on the playback substrate 21, and a ninth gear 52 which can engage with the eighth gear 46 is arranged at the end of this group of gears. When the eighth gear 46 meshes with the ninth gear 52, the rotation of the second gear 37 is transmitted to the feed roller 4 by rotation.

Figure 7:
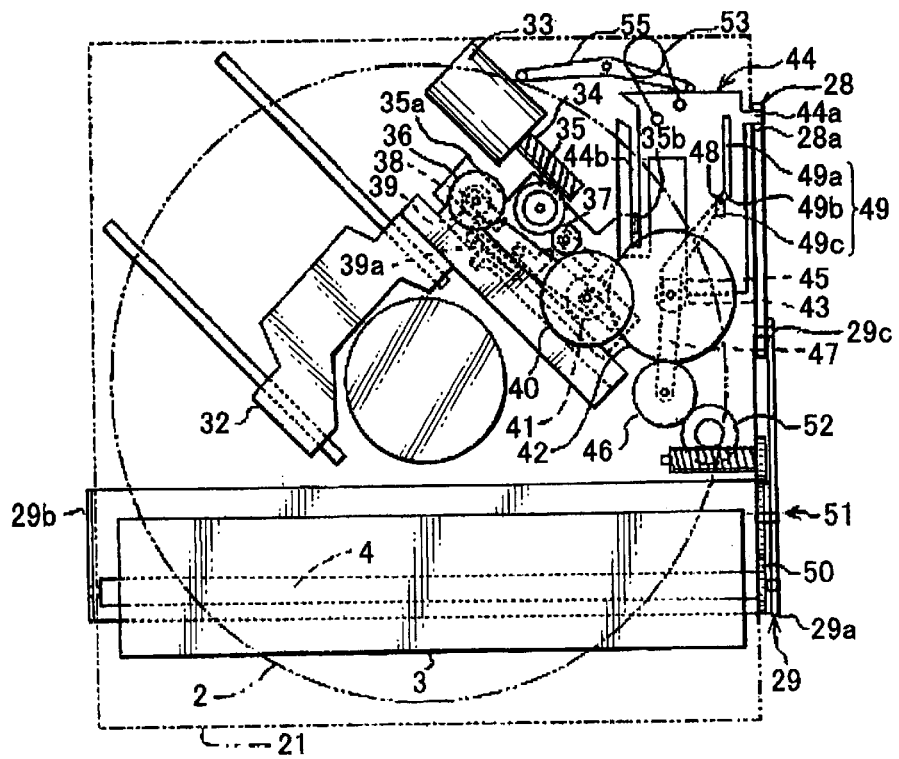
FIG. 7 is a plan view showing the state when the disk is being ejected.

The above control plate 44 advances or retreats corresponding to the direction of rotation of the second gear 37, and is stably held at either position of the opposite movement termination positions by the contrarotating spring 53. As shown in FIG. 7, the rack 45 in the control plate 44 can be separated from the sixth gear 43 by the energizing force of the contrarotating spring 53 at the movement termination position where the control plate 44 is directed to the inner side of the playback substrate 21. In this control plate 44, there are also formed a protruding piece 44a which is fitted to a square hole 28a in the cam plate 28, and a long groove 44b which meshes with or disengages from an engagement piece 35b in the move board 35a, and when it meshes with the engagement piece 35b, it restrains the movement of the move board 35a.

The cam groove 49 (rotation control section) is formed by a first linear section 49a which maintains the eighth gear 46 and the ninth gear 52 in the alienated state from each other, even if the control plate 44 moves, a slope section 49b which presses the cam follower 48 to thereby rotate the arm 47 so that the eighth gear 46 meshes with the ninth gear 52, when the control plate moves towards the inner side of the playback substrate 22 and reaches the terminal end, and a second linear section 49c which maintains the eighth gear 46 and the ninth gear 52 in the meshed state, when the control plate moves further to the inner side of the playback substrate 22.

A trigger member 55 is provided in the inner side of the playback substrate 21 with the intermediate portion thereof rotatably supported on the playback substrate. This trigger member 55 abuts against the control plate 44 and rotates, when the control plate 44 moves towards the inner side of the playback substrate 21, to thereby push out the disk located in the playback position towards the disk insertion slot 9. On the other hand, when the disk 2 is carried onto the turntable 7 from the disk insertion slot 9, the circumference of the disk 2 abuts against the trigger member 55 to rotate the trigger member 55, so that the trigger member 55 shifts the control plate 44 against the spring force of the contrarotating spring 53 to thereby mesh the rack 45 with the seventh gear 43.

A turning plate 56 is rotatably attached to the rotation axis of the fourth gear 40, and this turning plate 56 turns in one direction by a cam 39a formed in the rack plate 39 of the pickup 32, when the pickup 32 starts to move in the circumferential direction of the disk so as to perform the playback of the disk, to thereby restrain the movement of the move board 35a and maintain the meshed state between the worm wheel 35 and the first gear 36. On the other hand, when the pickup 32 is shifted to the lead-in position of the disk 2, the turning plate 56 is pushed by the cam 39a on the rack plate 39 to turn in the other direction, to thereby release the restraint of the movement of the move board 35a. Thereafter, the worm wheel 35 moves towards the second gear 37 by a driving force of the worm gear 34 to engage with the second gear 37, to thereby transmit the rotation of the pickup motor 33 to the seventh gear 43 by rotation.

Figure 8:
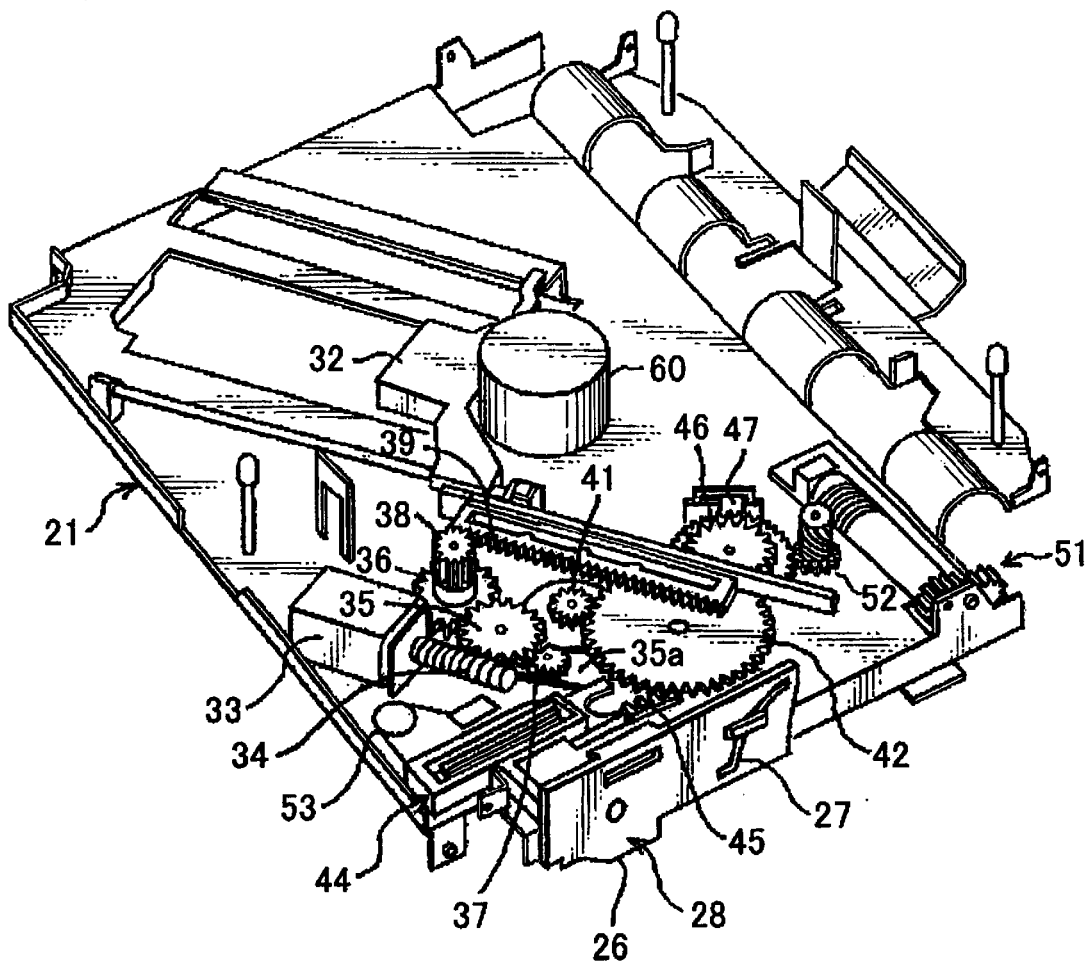
FIG. 8 is a diagram showing the backside of a substrate of the disk player according to one embodiment.

FIG. 8 shows a substrate of the disk player as seen from the backside. A motor 60 for supporting the turntable 7 is arranged at the center of the playback substrate 21, and the pickup 32 is attached to the substrate so as to be able to freely move in the diagonal direction of the playback substrate. This pickup 32 moves in the advancing or retreating direction, when the rotation of the worm gear 34 is transmitted to the rack 39 via the worm wheel 35, the first gear 36 and the third gear 38. Also, when meshed with the second gear 37, the worm wheel 35 transmits the rotation of the second gear 37 to the control plate 44 via the fourth gear 40, the fifth gear 41, the sixth gear 42 and the seventh gear 43. On the other hand, the group of gears 51 meshing with the roller gear 50 of the feed roller 4 is mounted on the playback substrate 21. When meshed with the second gear 37, the worm wheel 35 transmits the rotation of the second gear 37 to the group of gears 51 via the fourth gear 40, the fifth gear 41, the sixth gear 42, the eighth gear 46 and the ninth gear 52. By arranging all gears serving to transmit the power of the motor 33 on the backside of the substrate which can be seen from outside of the device in this manner, repair of the power transmission system is facilitated.

Figure 9:
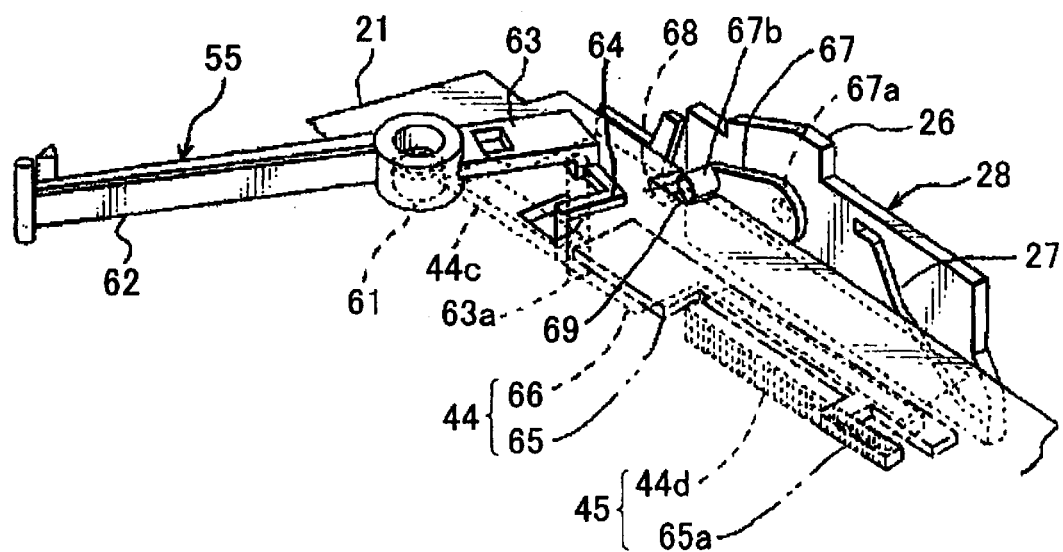
FIG. 9 is a diagram showing the engagement state between a trigger member and a control plate 44 and a cam plate 28 according to this embodiment.

FIG. 9 shows the relationship between the trigger member 55 and the control plate 44 in detail. In the trigger member 55, there are formed a long arm 62 abutting against the circumference of the disk and a short arm 63 which meshes the rack 45 with the seventh gear 43 (not shown), centering on a rotation supporting point 61. A thin crank arm 64 is formed at the turning end of this short arm 63. This crank arm 64 is fitted to a long hole 44c in the control plate, and with a movement of the control plate 44 when the disk 2 is carried onto the turntable 7, the crank arm 64 abuts against the edge of the long hole 44c, to thereby release the abutment of the trigger member 55 with the disk.

Moreover, a pin 63a protruding on the lower side of the substrate is formed at the turning end of the short arm 63, and this pin engages with the lead gear 65. This lead gear 65 constitutes a part of the control plate 44, and is attached to the body 66 of the control plate so as to be able to move within a predetermined range. The lead gear 65 is also connected to the body 66 with a weak spring (not shown), and moves in the advancing and retreating direction integrally with the body. The rack 45 is formed on the control plate 44. The rack 45 is constituted of a rack 44d of the body and a rack 65a of the lead gear 65, with the rack 65a being formed so as to overlap on the body rack 44d. When the disk 2 abuts against the edge of the long arm 62 to turn the trigger member 55, the pin 63a on the short arm 63 moves the lead gear 65 against the force of the weak spring, to thereby mesh the rack 65a of the lead gear 65 with the seventh gear 43. Then, the lead gear 65 moves a predetermined range to thereby move the body 66 so as to mesh the body rack 44d with the seventh gear 43. By meshing the rack 44 with the seventh gear 43 in this manner, the force for carrying the disk 2 to turn the trigger member 55 can be decreased.

FIG. 10 shows the relationship between the control plate 44 and the cam plate 28 in detail. Engagement of the control plate 44 with the cam plate 28 is performed via a lever 67 which is rotatably attached to the cam plate 28. The lever 67 has a rotation axis 67a fitted to the cam plate 28, and a boss 67b formed at the turning end. The boss 67b is engageable with a tilted cam groove 68 formed in the control plate 44. The substrate 21 has a through hole 69 through which the boss 67a passes from the upper side to the lower side of the substrate.

Figure 10A:
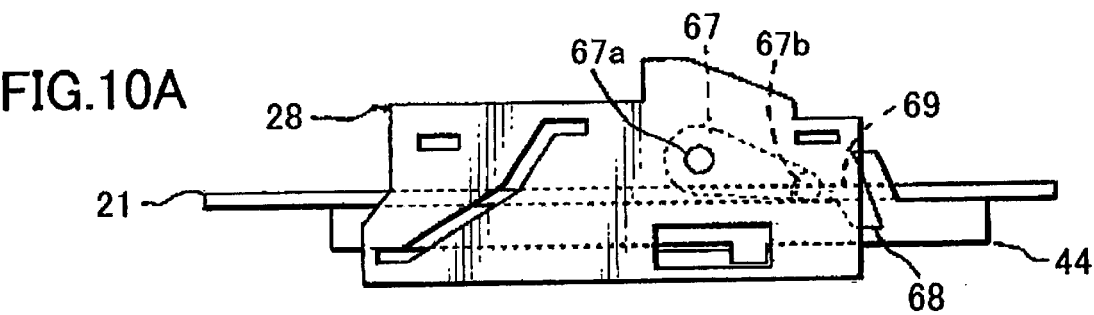
FIGS. 10A–10D are diagrams showing the synchronization order of the control plate 44 and the cam plate 28 according to this embodiment.
Figure 10B:
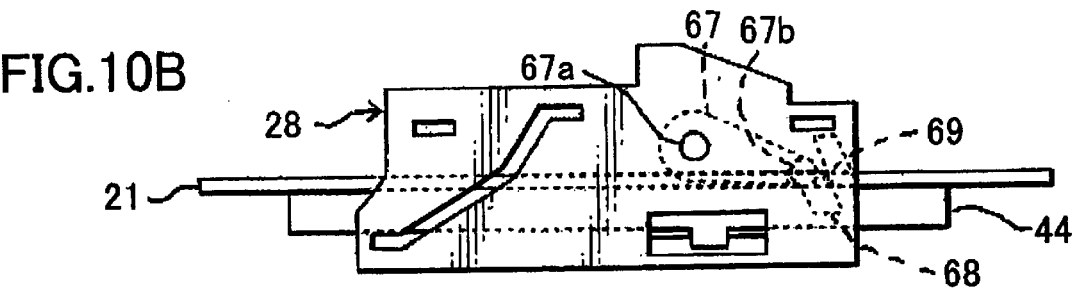
Figure 10C:
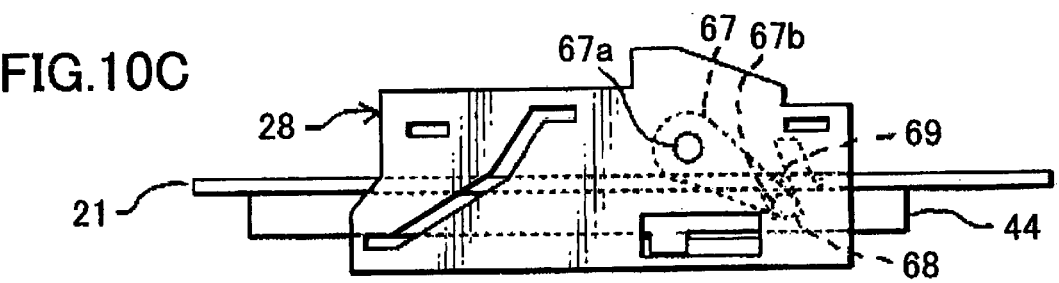
Figure 10D:
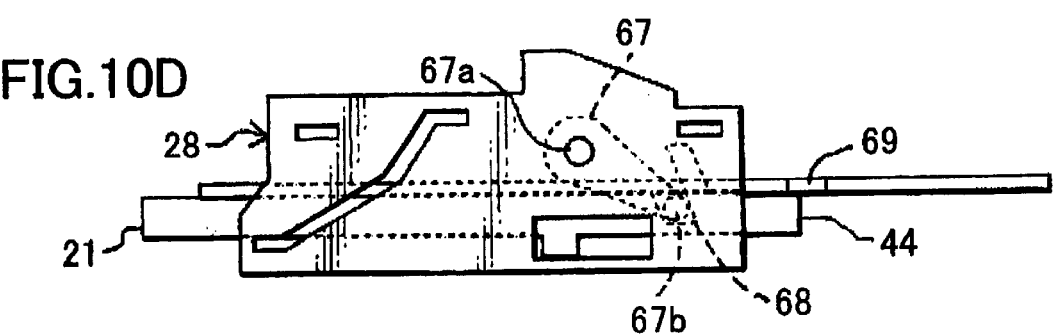
Figure 11:
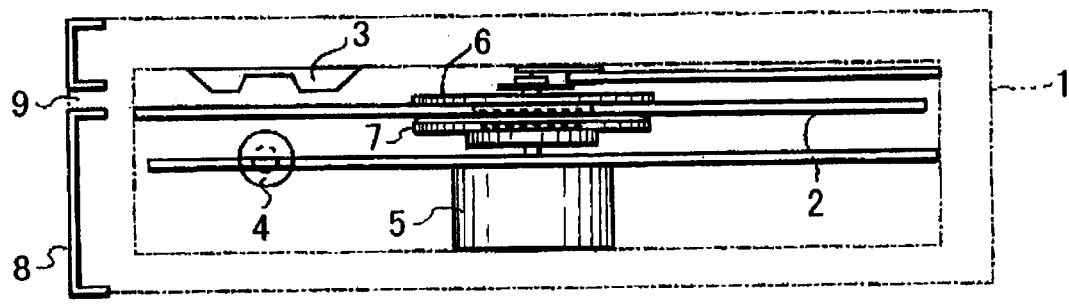
FIG. 11 is a side view showing the disk playback state in a conventional disk player.
Figure 12:
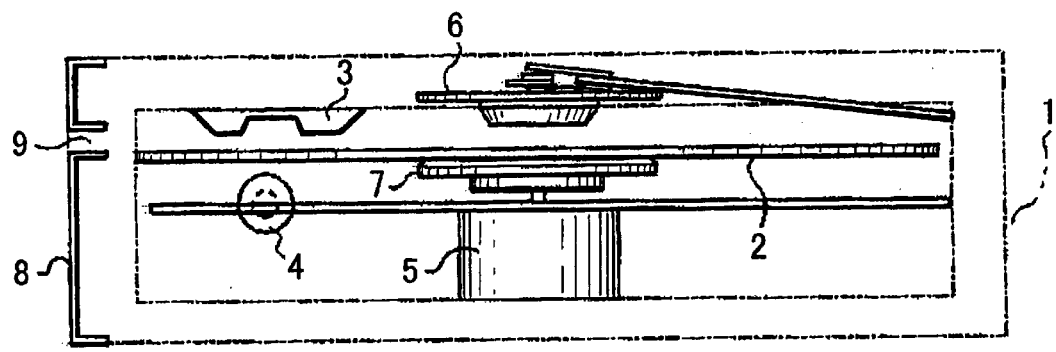
FIG. 12 is a side view showing the state when a clamper is alienated from a turntable in a conventional device.
Figure 13:
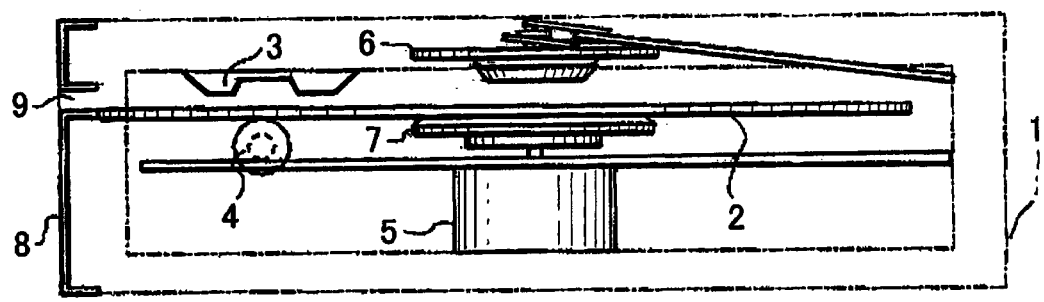
FIG. 13 is a side view showing the state when a feed roller comes in contact with the disk in the conventional device.
Figure 14:
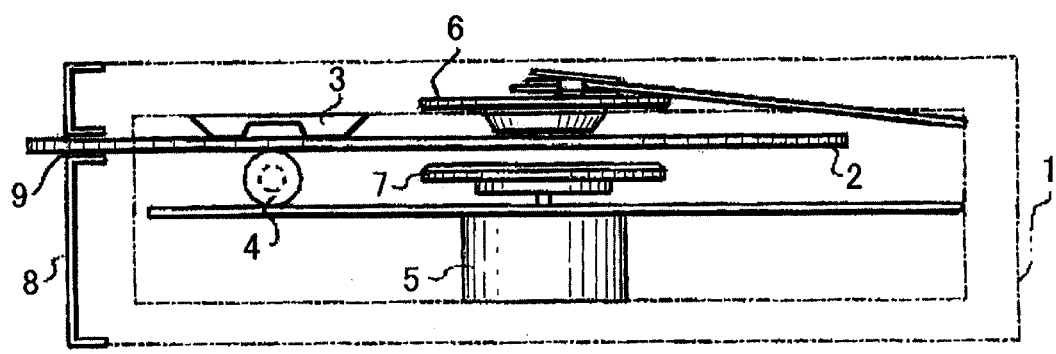
FIG. 14 is a side view showing the state when the disk is ejected from a disk insertion slot in the conventional device.

FIG. 10A shows the state where the control plate 44 and the cam plate 28 has not yet started to move, wherein the boss 67b is pushed up at the edge of the tilted cam groove 28 within the through hole 69. FIG. 10B shows the state where the control plate 44 has started to move to the left side, and the boss 67b abuts against the wall of the tilted cam groove 68. FIG. 10C shows the state where the control plate 44 further moves to the left side to push the boss 67b against the wall of the tilted cam groove 68 to go down up to the bottom of the groove, and the boss 67b passes through the through hole 69 and is located at the lower surface of the substrate 21. At this time, the cam plate 28 has not yet started to move. Thereafter, when the control plate 44 further moves to the left side, as shown in FIG. 10D, the tilted cam groove 68 moves the cam plate 28 together with the control plate 44 via the lever 67. The boss 67b is put between the bottom of the tilted cam groove 68 and the lower surface of the substrate 21.

On the other hand, when the control plate 44 moves to the right side from the position shown in FIG. 10D, the tilted cam groove 68 moves the cam plate 28 together with the control plate 44 via the lever 67. However, the movement of the cam plate 28 is restricted up to the position shown in FIG. 10C where the boss 67b faces the through hole 69 as shown in FIG. 10C, and thereafter only the control plate 44 moves to the right side. As described above, in sections of from A to D where the control plate 44 moves, only the control plate 44 moves in the sections of from A to C, and the arm 47 is turned in these sections to thereby mesh the eighth gear 47 with the ninth gear 52. As a result, there can be obtained timing for rotating the feed roller 4 by moving the cam plate 28 after the disk 2 is reliably clamped between the feed roller 4 and the disk guide 3.

The operation for carrying the disk 2 from the playback position on the turntable 7 to the disk insertion slot 9 in the front panel 8 by the disk carrier device of the present invention will now be described, with reference to FIG. 2 to FIG. 7.

In FIG. 2, the disk 2 is in the disk playback position clamped between the turntable 7 and the clamper 6, and the feed roller 4 is alienated from the surface of the disk 2, since the cam pin 29c is located in the upper horizontal groove 27a of the roller cam 27. The disk 2 is also alienated from the disk guide 3. On the other hand, the playback substrate 22 is located substantially at the center of the outside chassis 21, in the floating state with respect to the outside chassis 21. The difference in the height position between the disk insertion slot 9 and the disk guide 3 is large.

At this time, as shown in FIG. 4, the worm wheel 35 is maintained in the state meshing with the first gear 36, so that the pickup 32 moves or is movable towards the circumferential direction of the disk 2. Since the cam follower 48 is located in the first linear section 49a, the eighth gear 46 is held up at a position alienated from the ninth gear 52, to thereby intercept the transmission of rotation to the feed roller 4. When the ejection operation of the disk 2 is performed from this state, the pickup motor 33 rotates in the direction for making the pickup 32 approach the turntable 7. Thereby, when the pickup 32 reaches the lead-in position, the turning plate 56 turns to thereby release the fixation of the move board 35a. Then, the worm wheel 35 receives the driving force of the worm gear 34 and moves towards the second gear 37, so as to engage with the second gear 37 to transmit the rotation of the pickup motor 33 up to the seventh gear 43.

At this time, the rotation of the pickup motor 33 rotates the seventh gear 46 so that the control plate 44 is moved towards the inner side of the playback substrate 21. The control plate 44 starts to move towards the inner side of the playback substrate 21 by the rotation of the seventh gear 46. At this time, the engagement piece 35b in the move board 35a is fitted in the long groove 44b in the control plate 44, to thereby maintain the engaging state of the worm wheel 35 and the second gear 37. The cam plate 28 also starts to move towards the inner side of the playback substrate 21 together with the control plate 44. Then, as shown in FIG. 3, the clamp cam 26 pushes up the support plate 24, to thereby release the disk 2 held on the turntable 7 by the clamper 6.

Figure 5:
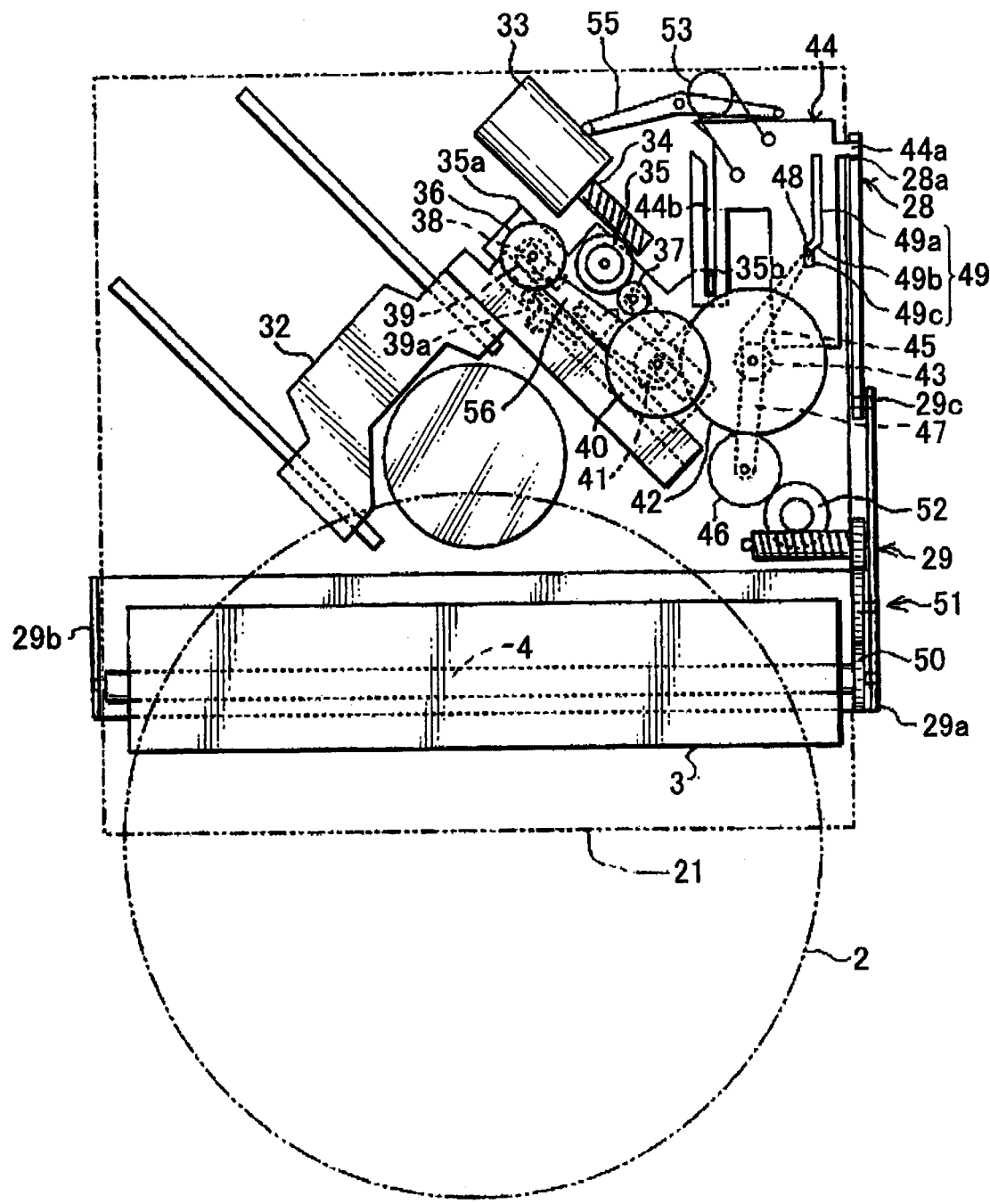
FIG. 5 is a plan view showing the state when the ejection operation of the disk has been performed.

At this time, the cam pin 29c of the bracket 29 is guided to the lower horizontal groove 27b through the tilted groove 27c, and the feed roller 4 comes in contact with the disk plane and then pushes up the disk 2 towards the disk guide 3. At this time, however, as shown in FIG. 5, the cam follower 48 is still located in the first linear section 49a, and the eighth gear 46 has not yet meshed with the ninth gear 52, and hence the rotation of the pickup motor 33 is not transmitted to the feed roller 4.

Figure 6:
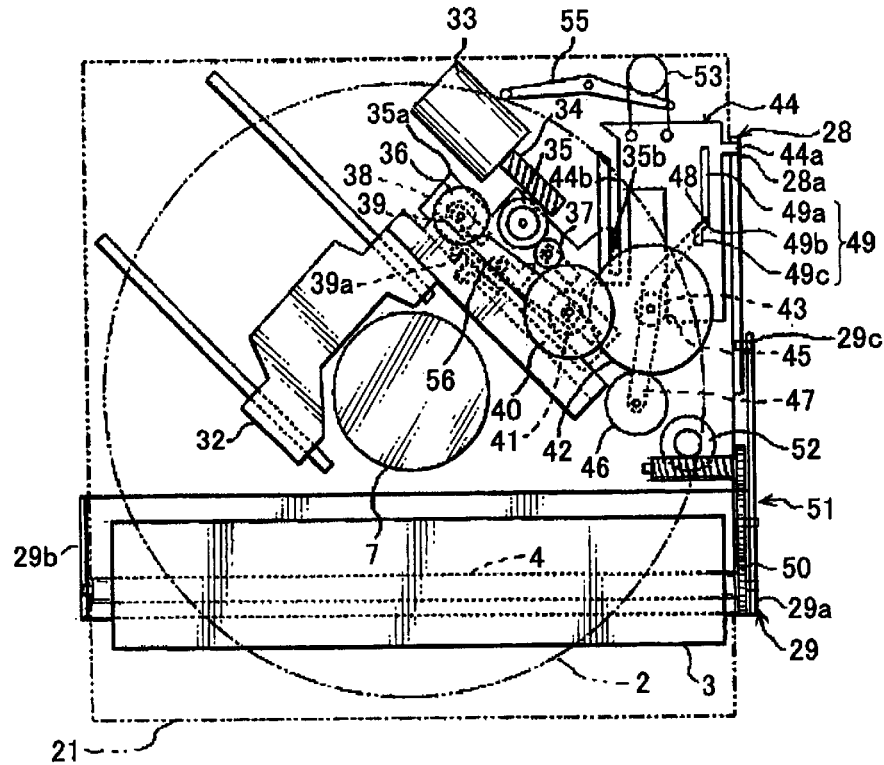
FIG. 6 is a plan view showing the state when the ejection operation of the disk is being performed.

When the control plate 44 and the cam plate 28 further move towards the inner side of the playback substrate 21, the cam pin 29c reaches the lower horizontal groove 27b, and the feed roller 4 presses the disk 2 to the disk guide 3 and clamp the disk 2 therebetween. With this operation, the bracket 29 fits the protrusion 31 into the lock hole 30, so that the upper part 21a of the playback substrate 21 is pressed to the ceiling 22a of the outside chassis 22, to thereby restrain the floating state of the playback substrate 21 with respect to the outside chassis 22. The disk 2 is then pressed against the disk guide 3 by the feed roller 4, so that the height position of the disk guide 3 coincides with the height position of the disk insertion slot 9. On the other hand, when the floating state of the playback substrate 21 with respect to the outside chassis 22 is restrained, as shown in FIG. 6, the cam follower 48 passes through the slope section 49c and reaches the second linear section 49c, so as to turn the arm 47 to thereby mesh the eighth gear 47 with the ninth gear 52.

Then, the rotation of the pickup motor 33 is transmitted to the feed roller 4, and as shown in FIG. 7, the disk 2 is ejected from the disk insertion slot 9, in the state being clamped between the feed roller 4 and the disk guide 3. At this time, the engagement between the rack 45 in the control plate 44 and the seventh gear 43 is released by the spring force of the contrarotating spring 53, and the movement of the control plate 44 by the seventh gear 43 is released.

As described above, according to the disk carrier device in this embodiment, after the disk 2 is positioned by the feed roller 4 and the disk guide 3, the feed roller 4 is rotated to carry the disk 2 from the disk insertion slot 9. Therefore, the disk 2 can be ejected, without abutting against or being caught by the edge of the disk insertion slot 9. Moreover, as in this embodiment, even in a disk carrier device in which the disk insertion slot 9 is biased to the upper position with respect to the front panel, in order to increase the area of the display screen 8a in the front panel 8, the disk 2 can be ejected from the disk insertion slot 9 reliably and safely. Furthermore, in this embodiment, the cam plate 28 and the control plate 44 constitute the control member, and the roller position control section 27 and the rotation control section 49 are separately provided therein. However, the cam plate 28 and the control plate 44 may be integrally formed.

The disk carrier device of the present invention has the feed roller and the disk guide arranged between the disk insertion slot and the turntable, and comprises the carrier gear rotation-driven by the motor, a roller gear for rotating the feed roller, a transmission gear selectively meshing with the carrier gear and the roller gear, and a control member moved in the advancing or retreating direction by being driven by the motor. A rotation control section is formed in this control member, which controls the mesh of the roller position control section which controls clamping of the disk between the feed roller and the disk guide and the transmission gear with the carrier gear and the roller gear, when the disk is pushed out towards the insertion slot. When the disk is ejected towards the insertion slot, after being clamped between the feed roller and the disk guide, the feed roller is rotated to thereby eject the disk from the disk insertion slot.

After the ejection position of the disk with respect to the disk insertion slot is set by the disk guide, the disk is carried towards the disk insertion slot. Therefore, the disk does not contact with the edge of the disk insertion slot, nor is caught thereby.

What is claimed is:

1. A disk carrier device which carries a disk towards a disk insertion slot by making a feed roller approach a disk guide, alienating the disk on a turntable from the turntable by the feed roller and then clamping the disk between the feed roller and the disk guide, and rotating the feed roller in the unloading direction by a motor, wherein the disk carrier device comprises:

a carrier gear rotation-driven by the motor;

a control member driven by the motor via the carrier gear, for moving in one direction or in the other direction according to the direction of rotation of the motor; and a transmission gear which is located alternatively at a transmission position or at a non-transmission position, and transmits the rotation of the motor to the feed roller at the transmission position, the control member is provided with a rotation control section for shifting the transmission gear from the non-transmission position to the transmission position in a part of the moving range of the control member, and a roller position control section for shifting the feed roller from the alienating position to the approaching position with respect to the disk guide in the other part of the moving range thereof, and when the direction of rotation of the carrier gear is in the direction of rotating the feed roller in the unloading direction via the transmission gear, the feed roller is made to approach the disk guide by the roller position control section, with the movement of the control member, and then the transmission gear is shifted to the transmission position by the rotation control section.

2. The disk carrier device according to claim 1, wherein the roller position control section and the rotation control section are respectively constituted by a cam groove.

3. The disk carrier device according to claim 1, wherein the control member is stably held alternatively at the opposite movement termination positions by a contrarotating spring.

* * * * *